(12) United States Patent
Yoshida

(10) Patent No.: US 9,426,437 B2
(45) Date of Patent: Aug. 23, 2016

(54) IMAGE PROCESSOR PERFORMING NOISE REDUCTION PROCESSING, IMAGING APPARATUS EQUIPPED WITH THE SAME, AND IMAGE PROCESSING METHOD FOR PERFORMING NOISE REDUCTION PROCESSING

(71) Applicant: Kazuhiro Yoshida, Kanagawa (JP)

(72) Inventor: Kazuhiro Yoshida, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 14/419,569

(22) PCT Filed: Sep. 3, 2013

(86) PCT No.: PCT/JP2013/074175
§ 371 (c)(1),
(2) Date: Feb. 4, 2015

(87) PCT Pub. No.: WO2014/038685
PCT Pub. Date: Mar. 13, 2014

(65) Prior Publication Data
US 2015/0215595 A1    Jul. 30, 2015

(30) Foreign Application Priority Data
Sep. 10, 2012 (JP) .................. 2012-198043

(51) Int. Cl.
| | | |
|---|---|---|
| H04N 5/217 | (2011.01) | |
| H04N 9/64 | (2006.01) | |
| H04N 9/04 | (2006.01) | |
| G06T 5/00 | (2006.01) | |
| G06T 11/60 | (2006.01) | |
| H04N 1/60 | (2006.01) | |
| G06T 5/50 | (2006.01) | |

(52) U.S. Cl.
CPC ............. *H04N 9/646* (2013.01); *G06T 5/002* (2013.01); *G06T 5/50* (2013.01); *G06T 11/60* (2013.01); *H04N 1/60* (2013.01); *H04N 5/2173* (2013.01); *H04N 9/045* (2013.01); *G06T 2207/10024* (2013.01); *G06T 2207/20221* (2013.01)

(58) Field of Classification Search
CPC ...................................................... H04N 9/646
See application file for complete search history.

(56) References Cited

U.S. PATENT DOCUMENTS

| | | |
|---|---|---|
| 2004/0080640 A1 | 4/2004 | Aoki et al. |
| 2008/0247671 A1 | 10/2008 | Yasuma et al. |
| 2011/0134292 A1 | 6/2011 | Hirai |

FOREIGN PATENT DOCUMENTS

| | | |
|---|---|---|
| JP | 10-200906 | 7/1998 |
| JP | 2002-262299 | 9/2002 |
| JP | 2005-136765 | 5/2005 |
| JP | 2008-258931 | 10/2008 |
| JP | 2011-109496 | 6/2011 |
| WO | 2011/067850 | 6/2011 |

OTHER PUBLICATIONS

International Search Report issued on Dec. 10, 2013 in PCT/JP2013/074175 filed on Sep. 3, 2013.

*Primary Examiner* — Gary C Vieaux
(74) *Attorney, Agent, or Firm* — Oblon, McClelland, Maier & Neustadt, L.L.P

(57) ABSTRACT

An image processor includes a first image creator which creates first noise-processed image data by performing noise reduction processing on data on one image acquired by an imaging device, a second image creator which creates second noise-processed image data by performing noise reduction processing corresponding to a false color generated in the first noise-processed image data, and an image synthesizer which performs false color reduction by synthesizing the first noise-processed image data and the second noise-processed image data.

18 Claims, 14 Drawing Sheets

TOP VIEW OF CAMERA

FRONT VIEW OF CAMERA

BACK VIEW OF CAMERA

EXAMPLE OF GAMMA CORRECTION CURVE

CHARACTERISTICS OF OUTPUT DEVICE

FIG.8A

BEFORE
INTERPOLATION
PROCESSING

| R1 | Gr2 | R3 | Gr4 | R5 |
|---|---|---|---|---|
| Gb6 | B7 | Gb8 | B9 | Gb10 |
| R11 | Gr12 | R13 | Gr14 | R15 |
| Gb16 | B17 | Gb18 | B19 | Gb20 |
| R21 | Gr22 | R23 | Gr24 | R25 |

FIG.8B

AFTER
INTERPOLATION
PROCESSING
(R INFORMATION)

| R1 | R2 | R3 | R4 | R5 |
|---|---|---|---|---|
| R6 | R7 | R8 | R9 | R10 |
| R11 | R12 | R13 | R14 | R15 |
| R16 | R17 | R18 | R19 | R20 |
| R21 | R22 | R23 | R24 | R25 |

FIG.8C

AFTER
YCbCr CONVERSION
(Cr INFORMATION)

| Cr1 | Cr2 | Cr3 | Cr4 | Cr5 |
|---|---|---|---|---|
| Cr6 | Cr7 | Cr8 | Cr9 | Cr10 |
| Cr11 | Cr12 | Cr13 | Cr14 | Cr15 |
| Cr16 | Cr17 | Cr18 | Cr19 | Cr20 |
| Cr21 | Cr22 | Cr23 | Cr24 | Cr25 |

FIG.9A

LPF (MEDIUM)

| 1 | 1 | 1 |
|---|---|---|
| 1 | 4 | 1 |
| 1 | 1 | 1 |

FIG.9B

LPF (STRONG)

| 1 | 1 | 1 |
|---|---|---|
| 1 | 1 | 1 |
| 1 | 1 | 1 |

FIG.9C

LPF (WEAK)

| 1 | 1 | 1 |
|---|---|---|
| 1 | 8 | 1 |
| 1 | 1 | 1 |

FIG.10A

HPF

| -1 | -1 | -1 |
|---|---|---|
| -1 | 8 | -1 |
| -1 | -1 | -1 |

FIG.10B

HPF (BEFORE INTERPOLATION PROCESSING (1))

| -1 | 0 | -1 |
|---|---|---|
| 0 | 4 | 0 |
| -1 | 0 | -1 |

FIG.10C

HPF (BEFORE INTERPOLATION PROCESSING (2))

| -1 | 0 | -1 | 0 | -1 |
|---|---|---|---|---|
| 0 | -1 | 0 | -1 | 0 |
| -1 | 0 | 12 | 0 | -1 |
| 0 | -1 | 0 | -1 | 0 |
| -1 | 0 | -1 | 0 | -1 |

FIG.11A
LUMINANCE DATA

| Y1 | Y2 | Y3 | Y4 | Y5 |
|---|---|---|---|---|
| Y6 | Y7 | Y8 | Y9 | Y10 |
| Y11 | Y12 | Y13 | Y14 | Y15 |
| Y16 | Y17 | Y18 | Y19 | Y20 |
| Y21 | Y22 | Y23 | Y24 | Y25 |

FIG.11B
G DATA

| G1 | G2 | G3 | G4 | G5 |
|---|---|---|---|---|
| G6 | G7 | G8 | G9 | G10 |
| G11 | G12 | G13 | G14 | G15 |
| G16 | G17 | G18 | G19 | G20 |
| G21 | G22 | G23 | G24 | G25 |

FIG.11C
DATA BEFORE INTERPOLATION PROCESSING

| Gr1 | R2 | Gr3 | R4 | Gr5 |
|---|---|---|---|---|
| B6 | Gb7 | B8 | Gb9 | B10 |
| Gr11 | R12 | Gr13 | R14 | Gr15 |
| B16 | Gb17 | B18 | Gb19 | B20 |
| Gr21 | R22 | Gr23 | R24 | Gr25 |

HUE AND CHROMA DETECTION

LUMINANCE DETECTION

FIG.13

| | 0≦FCL<60 | 60≦FCL<120 | 120≦FCL<180 | 180≦FCL≦255 |
|---|---|---|---|---|
| NR LEVEL | 1 | 2 | 3 | 4 |

FCL : FALSE COLOR GENERATION LEVEL

FIG.14A

IMAGE SYNTHESIS RATIO TABLE

|  | 0<FCL<10 | 10≦FCL<50 | 50≦FCL<120 | 120≦FCL<180 | 180≦FCL≦255 |
|---|---|---|---|---|---|
| SYNTHESIS RATIO | 0 | 0.2 | 0.5 | 0.8 | 1 |

FCL : FALSE COLOR GENERATION LEVEL

FIG.14B

FALSE COLOR GENERATION LEVEL

| 5 | 8 | 25 | 102 | 190 |
|---|---|---|---|---|
| 2 | 32 | 140 | 204 | 222 |
| 16 | 160 | 211 | 240 | 130 |
| 93 | 198 | 227 | 165 | 103 |
| 225 | 232 | 147 | 110 | 72 |
|  |  |  |  |  |

FIG.14C

IMAGE SYNTHESIS TABLE

| 0 | 0 | 0.2 | 0.5 | 1 |
|---|---|---|---|---|
| 0 | 0.2 | 0.8 | 1 | 1 |
| 0.2 | 0.8 | 1 | 1 | 0.8 |
| 0.5 | 1 | 1 | 0.8 | 0.5 |
| 1 | 1 | 0.8 | 0.5 | 0.5 |
|  |  |  |  |  |

IMAGE PROCESSOR PERFORMING NOISE REDUCTION PROCESSING, IMAGING APPARATUS EQUIPPED WITH THE SAME, AND IMAGE PROCESSING METHOD FOR PERFORMING NOISE REDUCTION PROCESSING

TECHNICAL FIELD

The present invention relates to an image processor configured to perform noise reduction on image data acquired by an imaging device during shooting, an imaging apparatus equipped with the same, and an image processing method.

BACKGROUND ART

In an imaging device (single-plate solid-state imaging device) of a digital camera or the like, one color filter is generally provided for each photodiode to form a color filter array called a Bayer array, for example. Image data acquired by the imaging device is data (RAW data) having only color information on one color in each pixel, and can be seen as an image by interpolating color information lacking in each pixel from peripheral pixels.

For a subject having a frequency higher than a pixel spacing (pixel pitch) of the imaging device, failure to perform correct sampling causes moire and false colors. Particularly, in the imaging device having the Bayer array, a ratio of pixels of each of R and B to pixels of G is 1/2, leading to more likelihood of false colors.

As a general countermeasure to prevent this, an optical low-pass filter is inserted in front of the imaging device to lower the frequency of the subject. However, in this case, there are negative effects such as degraded resolution of the subject and cost increase caused by the optical low-pass filter.

Therefore, there has been proposed a method of reducing false colors by performing edge detection through edge detection filter processing on luminance components, detecting a false color by determining whether or not color-difference components are within a predetermined range, and then smoothing or taking an arithmetic average between false-color pixels and peripheral pixels in a region where the false color is detected (see, e.g., Patent Literature 1: Japanese Patent No. 4035688).

There has also been proposed a method of reducing false colors by taking two images at a focal position and a non-focal position of a lens, detecting false colors based on a difference between the two images, and then changing a mixture ratio of the two images (see, e.g., Patent Literature 2: Japanese Patent Application Publication No. 2011-109496).

However, among the above conventional technologies, when the processing is performed in a limited area for the false-color detected pixels and the peripheral pixels as in the case of Patent Literature 1, a special circuit configuration is required. This makes it difficult for a general-purpose image processing IC to perform the processing.

Also, when two images are taken as in the case of Patent Literature 2, a time lag occurs in shooting between the two images. For this reason, mixing of the two images also requires special processing such as extraction of feature points and alignment therebetween.

SUMMARY OF INVENTION

It is an object of the present invention to provide an image processor capable of reducing false colors generated in an image with a simple process configuration, and also to provide an imaging apparatus equipped with the same and an image processing method.

In order to achieve the above object, an aspect of the invention includes: a first image creator which creates first noise-processed image data by performing noise reduction processing for data on one image acquired by an imaging device; a second image creator which creates second noise-processed image data by performing noise reduction processing corresponding to a false color generated in the first noise-processed image data; and an image synthesizer which reduces false colors by synthesizing the first noise-processed image data and the second noise-processed image data.

BRIEF DESCRIPTION OF DRAWINGS

FIG. 1A is a top view of the digital camera, FIG. 1B is a front view of the digital camera, and FIG. 1C is a back view of the digital camera.

FIGS. 8A to 8C are diagrams showing positions to perform noise reduction, FIG. 8A showing a state before interpolation, FIG. 8B showing a state after interpolation of R information, and FIG. 8C showing a state after YCbCr conversion of Cr information.

FIGS. 9A to 9C are diagrams showing a low-pass filter used for noise reduction, FIG. 9A showing the case where the low-pass filter is at a medium level, FIG. 9B showing the case where the low-pass filter is at a strong level, and FIG. 9C showing the case where the low-pass filter is at a weak level.

FIG. 10A is a diagram showing an edge extraction filter, FIG. 10B is a diagram showing an edge extraction filter (1) before the interpolation, and FIG. 10C is a diagram showing an edge extraction filter (2) before interpolation.

FIG. 11A is a diagram showing brightness data, FIG. 11B is a diagram showing G data, and FIG. 11C is a diagram showing data before interpolation.

FIG. 13 is a diagram showing an example of NR level setting for a false color generation level (FCL) range.

FIG. 14A is a diagram showing an image synthesis ratio table, FIG. 14B is a diagram showing a false color generation level, and FIG. 14C is a diagram showing an image synthesis table.

DESCRIPTION OF EMBODIMENTS

Embodiments of the present invention will be described below with reference to the drawings.

Embodiments

Figure 1A:
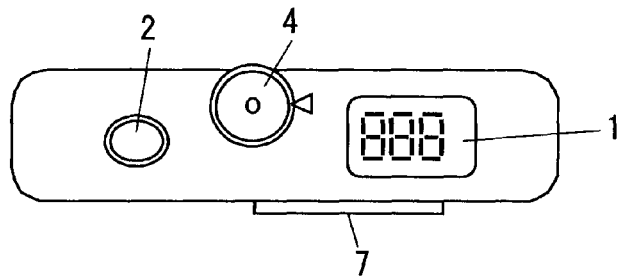
FIGS. 1A to 1C show a digital camera.
Figure 1B:
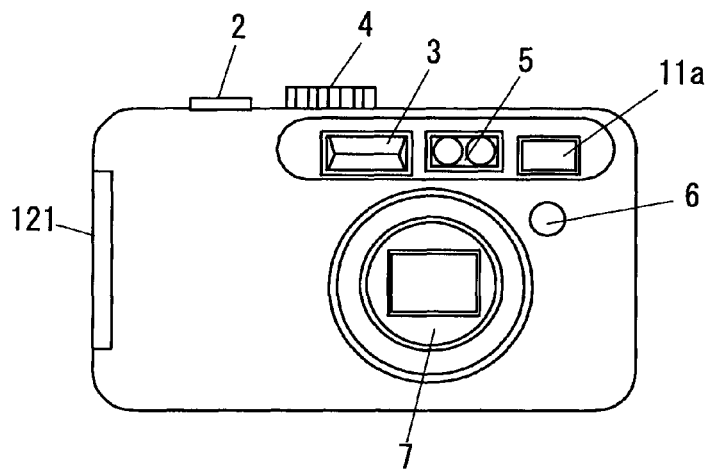
Figure 1C:
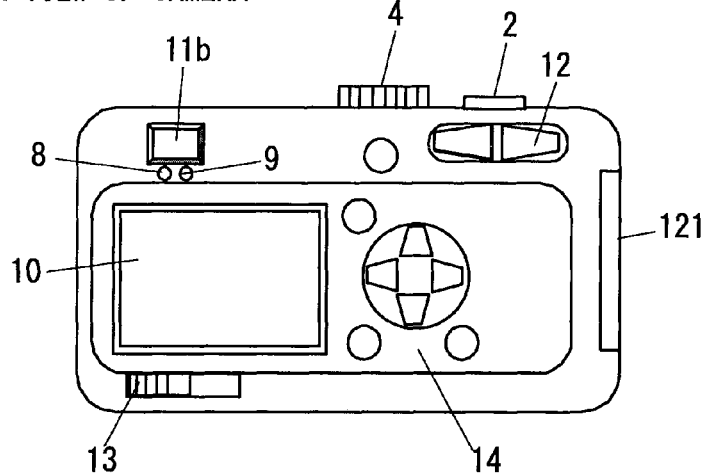

FIGS. 1A to 1C show a digital camera (imaging apparatus), and FIG. 1A is a top view of the digital camera, FIG. 1B is a front view of the digital camera, and FIG. 1C is a back view of the digital camera.

As shown in FIG. 1, the digital camera has a sub-LCD (liquid crystal display) 1, a release button 2 and a shooting/play switching dial 4 on its top. The sub-LCD 1 is a display unit to display the maximum number of images that can be shot, and the like, for example.

On the front of the digital camera, a strobe light emitting part 3, a ranging unit 5, a remote-control light receiving part 6, a barrel unit 7 and an optical finder (front side) 11a are provided. Moreover, on the back of the digital camera, an AF LED (autofocus light emitting diode) 8, a strobe LED 9, an LCD monitor 10, an optical finder (back side) 11b, a zoom button 12, a power switch 13, and an operation unit 14 are provided.

Also, on the side of the digital camera, a memory card throttle 121 is provided, into which a memory card 130 (see FIG. 2) is fitted.

Figure 2:
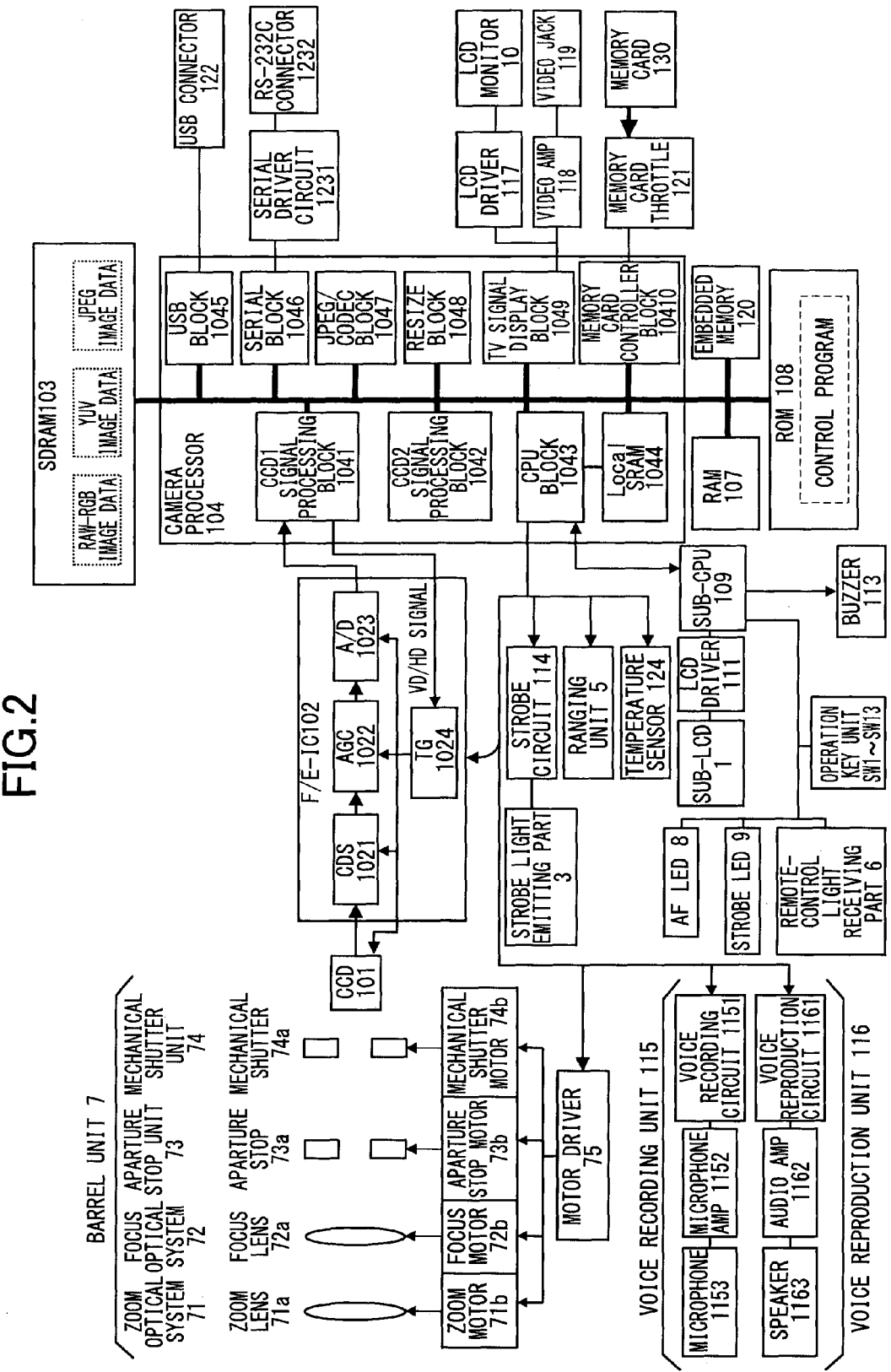
FIG. 2 is a block diagram of a control system of the digital camera.

FIG. 2 is a block diagram of a control system of the digital camera. In FIG. 2, reference numeral 104 denotes a camera processor. The camera processor 104 is a controller including a CCD1 signal processing block 1041, a CCD2 signal processing block 1042, a CPU block 1043, a Local SRAM 1044, a USB block 1045, a serial block 1046, a JPEG/CODEC block 1047, a RESIZE block 1048, a TV signal display block 1049, and a memory card controller block 10410. These blocks and the like are connected to each other through a bus line.

Moreover, outside the camera processor 104, there is provided an SDRAM 103 to store RAW-RGB image data, YUV image data and JPEG image data. The SDRAM 103 is connected to the camera processor 104 through a memory controller (not shown) and the bus line.

Outside the camera processor 104, there are further provided a RAM 107, an embedded memory 120 and a ROM 108 storing control programs, parameters and the like, all of which are also connected to the camera processor 104 through the bus line.

A strobe circuit 114 having the strobe light emitting part 3, the ranging unit 5 and a temperature sensor 124 are connected to the CPU block 1043 in the camera processor 104.

The strobe light emitting part 3 and the strobe circuit 114 are devices to supplement for the amount of light when the amount of light such as natural light is not enough. In shooting in a dark place or shooting a dark subject, the CPU block 1043 in the camera processor 104 transmits a strobe light emitting signal to the strobe circuit 114, with which the strobe circuit 114 causes the strobe light emitting part 3 to emit light to illuminate the subject.

The ranging unit 5 is a device to measure a distance between the camera and the subject. The current digital camera uses a CCD-AF system for focusing by detecting a contrast of an image formed in a CCD 101 that is an imaging device and then moving a lens to a position with the highest contrast. However, the CCD-AF system has a problem that a focusing operation is slow because the contrast is detected by moving the lens little by little.

To solve this problem, there has been an attempt to speed up the focusing operation by constantly acquiring information on the distance from the subject with the ranging unit 5 and instantly moving the lens based on the distance information.

The temperature sensor 124 is a device to measure the ambient temperature. The temperature sensor 124 measures the temperatures inside and outside the camera and turns off the power of the camera in case of an abnormal temperature rise, or changes the control of the camera by referring to data acquired by the temperature sensor 124.

The barrel unit 7 includes: a zoom optical system 71 having a zoom (ZOOM) lens 71a to capture an optical image of the subject, and a zoom motor 71b; a focus optical system 72 having a focus (FOCUS) lens 72a and a focus motor 72b; an aperture stop unit 73 having an aperture stop 73a and an aperture stop motor 73b; a mechanical shutter unit 74 having a mechanical shutter 74a and a mechanical shutter motor 74b; and a motor driver 75 to drive the motors.

The motor driver 75 is controlled to be driven according to a drive command from the CPU block 1043 in the camera processor 104 based on an input signal to the remote-control light receiving part 6 or an operation input to an operation Key unit SW1 to SW13 (the operation unit 14 in FIG. 1).

The ROM 108 stores a control program and parameters for control, which are described in a code readable by the CPU block 1043. When the power switch 13 (see FIG. 1) is operated to turn on the power of the digital camera, the program is loaded into an unillustrated main memory. Accordingly, the CPU block 1043 controls operations of the respective units according to the program, and temporarily stores data required for control and the like in the RAM 107 and the Local SRAM 1044 in the camera processor 104. Using a rewritable flash ROM as the ROM 108 enables the control program and the parameters for control to be changed, thereby facilitating function version upgrade.

The CCD 101 is a solid-state imaging device to perform photoelectric conversion on optical images. Also, an F/E (front end)-IC 102 includes a CDS 1021 to perform correlation double sampling for image noise removal, an AGC 1022 to perform gain adjustment, an A/D 1023 to perform digital signal conversion, and a TG 1024. A vertical synchronizing signal (VD signal) and a horizontal synchronizing signal (HD signal) are supplied to the TG 1024 by the CCD1 signal processing block 1041. Moreover, the TG 1024 generates a drive timing signal for the CCD 101 and the F/E-IC 102, which are controlled by the CPU block 1043.

The CCD1 signal processing block 1041 in the camera processor 104 performs white balance setting and gamma setting for output data from the F/E-IC 102, which is imaging data acquired by the CCD 101, and supplies the VD signal and the HD signal to the TG 1024 as described above. The CCD2 signal processing block 1042 performs filtering processing to convert data into brightness data or color-difference data.

The CPU block 1043 controls the operations of the respective units described above. The Local SRAM 1044 temporarily stores the data required for control and the like described above. The USB block 1045 performs USB communication with an external device such as a personal computer. The serial block 1046 performs serial communication with the external device such as the personal computer.

The JPEG/CODEC block 1047 performs JPEG compression and extension. The RESIZE block 1048 increases and reduces the size of the image data by interpolation. The TV signal display block 1049 converts the image data into video signals for display on an external display device such as a liquid crystal monitor and a TV. The memory card controller block 10410 controls the memory card 130 to record the shot image data.

The SDRAM 103 temporarily stores the image data when the image data is subjected to various processing by the camera processor 104. The image data to be stored includes "RAW-RGB image data" acquired by the CCD 101 through the F/E-IC 102 and subjected to the white balance setting and gamma setting by the CCD1 signal processing block 1041, "YCbCr image data" subjected to brightness data/color-difference data conversion by the CCD2 signal processing block 1042, "JPEG image data" subjected to JPEG compression by the JPEG/CODEC block 1047, and the like, for example.

A voice recording unit 115 is connected to the CPU block 1043 in the camera processor 104. The voice recording unit 115 includes a microphone 1153 to receive voice signals from a user, a microphone AMP 1152 to amplify the received voice signals, and a voice recording circuit 1151 to record the amplified voice signals.

Also, a voice reproduction unit 116 is connected to the CPU block 1043. The voice reproduction unit 116 includes a voice reproduction circuit 1161 to convert the recorded voice signals into signals that can be outputted from a speaker 1163, an audio AMP 1162 to amplify the converted voice signals and to drive the speaker 1163, and the speaker 1163 to output the voice signals.

A SUB-CPU 109 is connected to the CPU block 1043. The SUB-CPU 109 is a CPU having a ROM and a RAM embedded in one chip. The SUB-CPU 109 outputs output signals from the operation Key unit SW1 to SW13 or the remote-control light receiving part 6 to the CPU block 1043, as user operation information. Also, the SUB-CPU 109 converts the state of the camera outputted by the CPU block 1043 into a control signal for the sub-LCD 1, the AF LED 8, the strobe LED 9 and a buzzer 113, and outputs the control signal.

The sub-LCD 1 is a display unit to display the maximum number of images that can be shot, and the like, for example. The LCD driver 111 is a drive circuit to drive the sub-LCD 1 according to the output signal from the SUB-CPU 109.

The AF LED 8 is an LED to display a focusing status in shooting. The strobe LED 9 is an LED to display a strobe charging status. Note that the AF LED 8 and the strobe LED 9 may be used for another display purpose such as displaying a state where the memory card is being accessed. The operation Key unit SW1 to SW13 is a Key circuit to be operated by the user. The remote-control light receiving part 6 is a receiver to receive a signal from a remote-control transmitter operated by the user.

A USB connector 122 is connected to the USB block 1045. The USB connector 122 is a connector for USB connection with the external device such as the personal computer. Also, a serial driver circuit 1231 is connected to the serial block 1046. The serial driver circuit 1231 performs voltage conversion on an output signal from the serial block 1046 to perform serial communication with the external device such as the personal computer. An RS-232C connector 1232 for serial connection with the external device such as the personal computer is connected to the serial driver circuit 1231.

An LCD driver 117 and a video AMP 118 are connected to the TV signal display block 1049. Among them, the LCD driver 117 is a drive circuit to drive the LCD monitor 10 (see FIG. 1) and has a function to convert a video signal outputted from the TV signal display block 1049 into a signal to be displayed on the LCD monitor 10. The user can monitor the state of the subject before shooting, check the shot images or check the image data recorded in the memory card 130 and the embedded memory 120 by viewing the contents displayed on the LCD monitor 10.

Meanwhile, the video AMP 118 is an amplifier to convert the video signal outputted from the TV signal display block 1049 to 75Ω impedance. A video jack 119 is a jack for connection with the external display device such as the TV.

The memory card throttle 121 is connected to the memory card controller block 10410. The memory card throttle 121 is a throttle for mounting the detachable memory card 130. The embedded memory 120 is a memory to enable the shot image data to be stored even when the memory card 130 is not fitted into the memory card throttle 121 described above.

Figure 3:
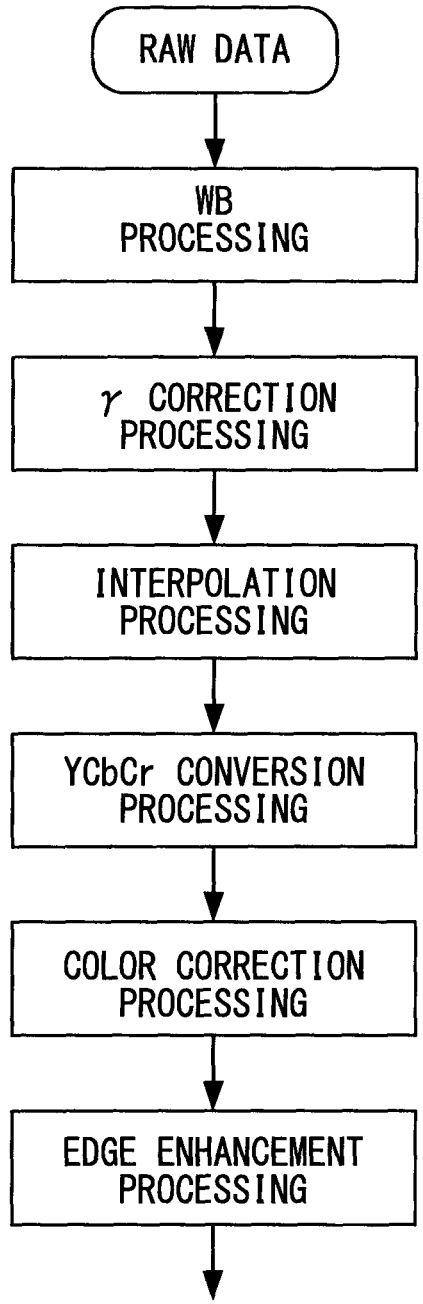
FIG. 3 is a diagram showing a general process flow of image processing.

Next, a general flow of image processing will be described. FIG. 3 shows a general process flow of image processing. This process flow is included in the CCD1 signal processing block 1041 and the CCD2 signal processing block 1042 shown in FIG. 2. Data obtained by subjecting a signal outputted from the CCD 101 to sampling for each pixel and then to A/D conversion is generally called RAW data because the data is yet to be subjected to image processing. Data to be inputted to an image processing unit is the RAW data.

The general flow of image processing is executed in the order of WB (white balance) processing, γ (gamma) correction processing, interpolation processing, YCbCr conversion processing, color correction processing and edge enhancement processing. These processings will be described in detail below.

[WB (White Balance) Processing]

A color filter of any one of colors, RED, GREEN and BLUE, is attached to each pixel of a CCD photodiode which accumulates light from the subject. However, since the amount of transmitted light varies depending on the color of the filter, the amount of charges to be accumulated in the photodiode also varies. GREEN is most sensitive, and RED and BLUE are less sensitive than GREEN, i.e., about half as sensitive as GREEN. In the WB processing, RED and BLUE are multiplied by a gain to cover such a difference in sensitivity and to make white in a shot image look whiter. Also, the color of an object varies depending on a light-source color (e.g., sunlight, fluorescent light or the like). Thus, even when a light source is changed, the gain of RED and BLUE is changed and controlled so as to make white look whiter.

[γ (Gamma) Correction Processing]

Figure 4A:
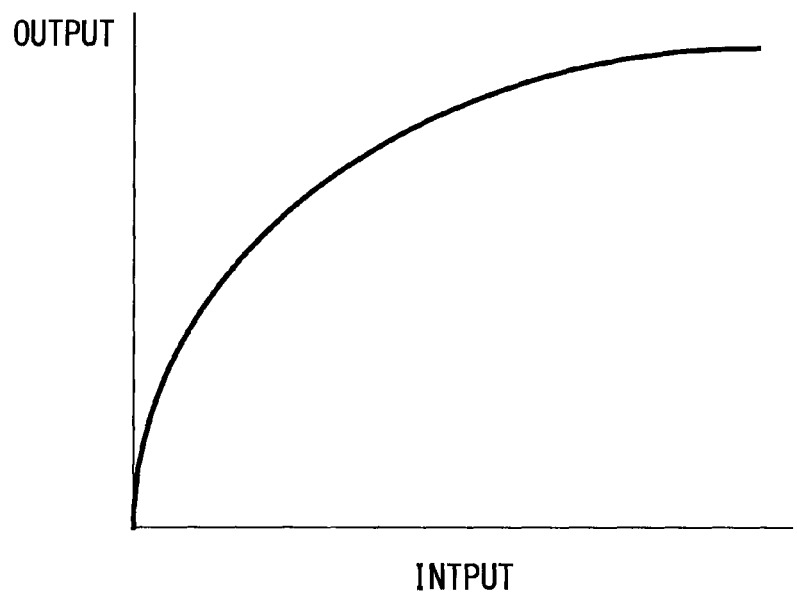
FIG. 4A is a diagram showing an example of a γ correction curve.
Figure 4B:
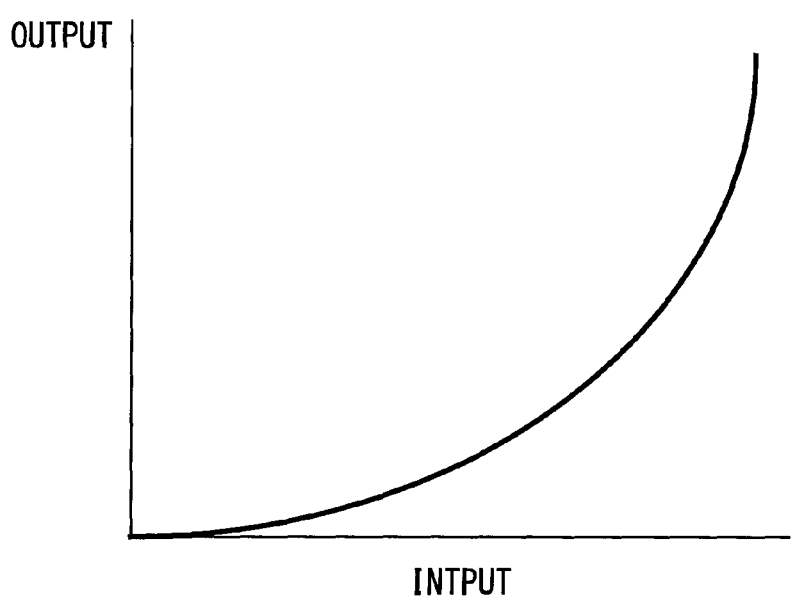
FIG. 4B is a diagram showing characteristics of a general output device such as an LCD and a CRT.

FIG. 4A shows an example of a γ correction curve. The horizontal axis indicates an input signal and the vertical axis indicates an output signal. In this processing, non-linear input-output conversion is performed. Generally, in an output device such as an LCD and a CRT, output is given in a non-linear pattern with respect to input as shown in FIG. 4B. In the case of such a non-linear output, the brightness has no gradation and the image turns out to be dark. For this reason, a person cannot correctly see the image. Thus, the γ correction processing is performed considering the characteristics of the output device to preprocess the input signal so that the output maintains its linearity with respect to the input.

[Interpolation Processing]

The CCD has an array called a Bayer array, in which a color filter of any one of the colors, RED, GREEN and BLUE, is attached to each pixel. The RAW data only has information on one color in one pixel. However, in order to view the RAW data as an image, the data needs to have information on the three colors, RED, GREEN and BLUE, in one pixel. Therefore, interpolation processing is performed to interpolate information on lacking two colors from peripheral pixels.

[YCbCr Conversion Processing]

While an RGB data format of the three colors, RED, GREEN and BLUE, is used at the RAW data stage, conversion to a YCbCr data format of a luminance signal Y and a color-difference signal CbCr is performed in YCbCr conversion processing. As to a JPEG image having a file format generally used for a digital camera or the like, an image is created from YCbCr data. Thus, the RGB data is converted into YCbCr data. The conversion equations are as follows.

$$Y = 0.299 \times R + 0.587 \times G + 0.114 \times B$$

$$Cb = -0.299 \times R - 0.587 \times G + 0.886 \times B$$

$$Cr = 0.701 \times R - 0.587 \times G - 0.114 \times B$$

Here, R denotes RED, G denotes GREEN and B denotes BLUE.

[Color Correction Processing]

Figure 5:
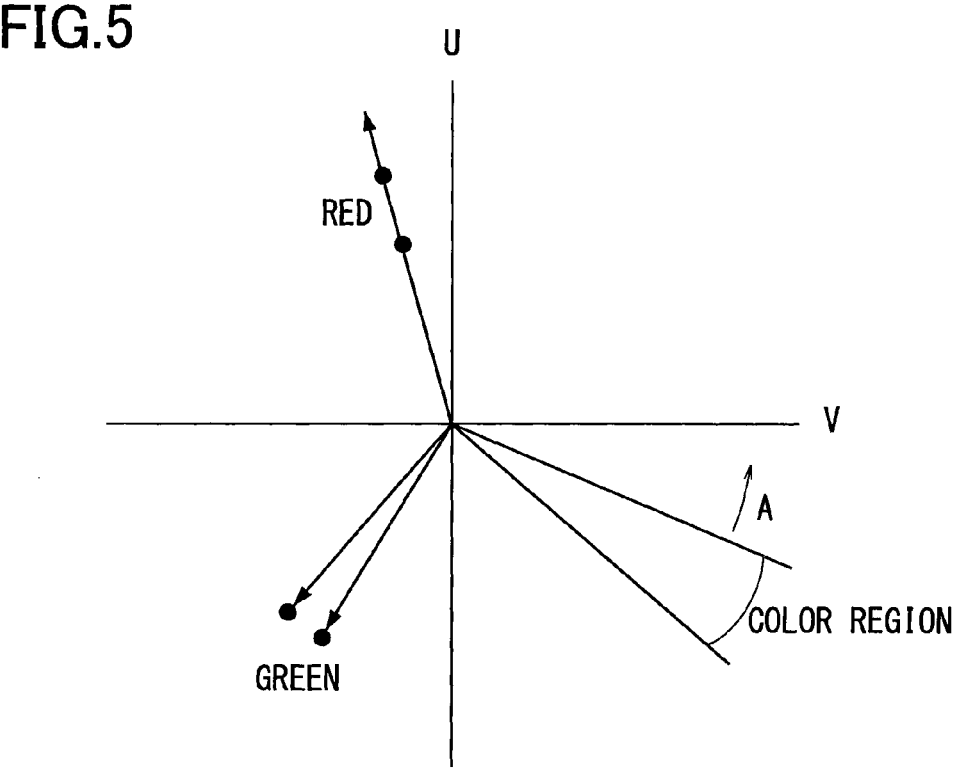
FIG. 5 is a diagram showing characteristics of color correction in a CbCr color space.

Color correction includes chroma setting, hue setting, partial hue change setting, color suppression setting, and the like. The chroma setting is parameter setting to determine the color density. FIG. 5 shows a CbCr color space. For example, for the color of RED, the longer the vector length from the origin to the RED dot in the second quadrant, the higher the color density.

Next, the hue setting is parameter setting to determine the shades of color. For example, even if the vector length is the same for the color of GREEN in the third quadrant in FIG. 5, the shades of color vary when the direction of the vector is changed.

The partial hue change setting is a setting to rotate a partial color region in the direction of arrow A as shown in the fourth quadrant in FIG. 5. When the chroma is strong, the color density is increased and, at the same time, color noise tends to be increased.

Thus, in the color suppression setting, a threshold is set for the luminance signal, for example, and color noise suppression control is performed by suppressing the chroma in a region lower or higher than the threshold.

[Edge Enhancement Processing]

Figure 6:
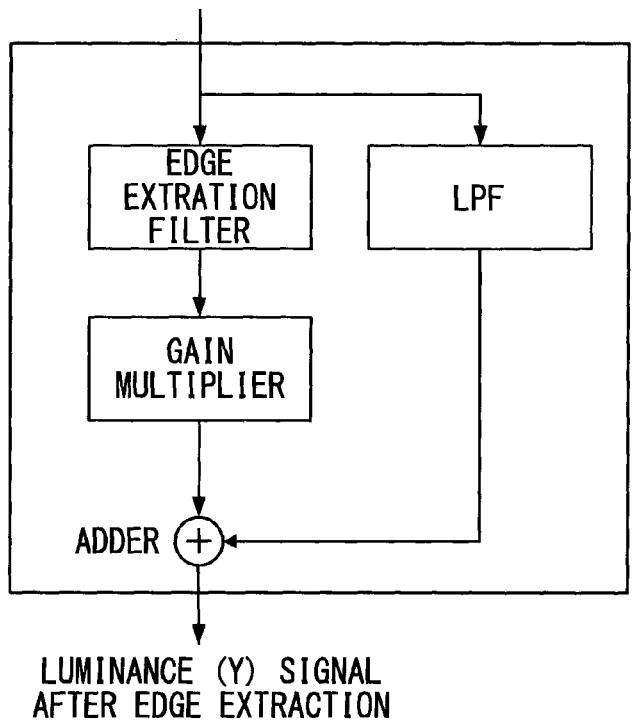
FIG. 6 is a diagram showing an internal configuration of a device to perform edge enhancement processing.

As shown in FIG. 6, the edge enhancement processing includes: an edge extraction filter to extract an edge portion from the luminance signal Y of the image; a gain multiplier to multiply the edge extracted by the edge extraction filter by a gain; a low-pass filter (LPF) to remove image noise in parallel with the edge extraction; and an adder to add the edge extraction data after the gain multiplication and the image data after the LPF processing. The edge strength is determined by the gain used by the gain multiplier. The edge is strong when the gain is large, while the edge is weak when the gain is small.

The edge enhancement processing is an important parameter because the edge detection direction or edge extraction amount also varies depending on a filter coefficient of the edge extraction filter. With the filter coefficient of the LPF, the image noise is reduced by smoothing the image. While the stronger the LPF, the less the noise, fine portions are crushed by the smoothing, resulting in a likelihood of losing the resolution.

[Other Processing]

The image processing also includes resize processing of changing to the image size to be stored, JPEG compression processing of compressing the information amount, and the like.

Embodiment 1

Figure 7:
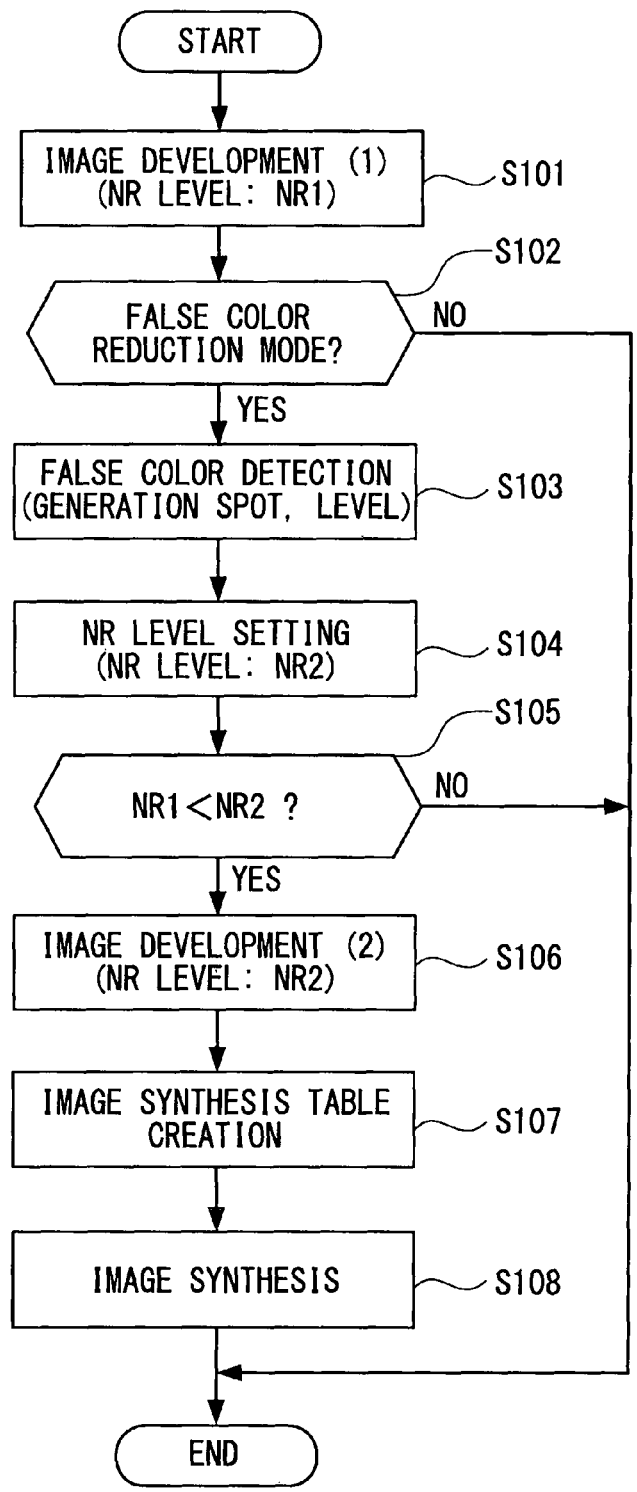
FIG. 7 is a diagram showing a process flow in Embodiment 1 to process RAW data.

Next, description will be given of Embodiment 1 of the present invention applied to the digital camera described above. This embodiment is an example of RAW data processing. As shown in FIG. 7, a process flow thereof includes image development (1) processing (Step S101), false color (color moire) reduction mode determination processing (Step S102), false color detection processing (Step S103), NR level setting processing (Step S104), NR level determination processing (Step S105), image development (2) processing (Step S106), image synthesis table creation processing (Step S107), and image synthesis processing (Step S108). Note that the process flow shown in FIG. 7 is stored in the ROM 108 or the memory card 130. The above processings will be described in detail below.

[Image Development (1) Processing]

In Step S101, image development of RAW data is performed. In the image development, an image is generated by performing a series of image processing (WB processing, γ correction processing, interpolation processing, YCbCr conversion processing, color correction processing, edge enhancement processing, and the like) on the RAW data (data on one image).

Here, description will be given of noise reduction (NR) not listed in the image processing flow shown in FIG. 3. The noise reduction is processing to reduce noise contained in the image. A method for the noise reduction varies depending on when to perform the noise reduction (before or after the interpolation processing or after the YCbCr conversion). With reference to FIG. 8, description will be given below of characteristics of each timing of noise reduction and noise reduction methods.

(A) Before Interpolation Processing

As shown in FIG. 8A, image data before interpolation processing only has information on one color in each pixel in the same Bayer array as that of the RAW data.

(B) after Interpolation Processing

By the interpolation processing, lacking color information is interpolated from peripheral pixels. In an example of R information, every pixel has R information as shown in FIG. 8B. The processing is similarly performed for G and B information, thus allowing each pixel to have information on the three colors, R, G and B.

(C) after YCbCr Conversion

The RGB signal is converted into a YCbCr signal, and the image data becomes information on luminance (Y) and color difference (CbCr).

As an advantage related to the timing of noise reduction, calculation cost is saved because the information amount is smaller before the interpolation processing than after the interpolation processing. The processing of pixels of the same color enables a target pixel to be widely referred to with a small number of peripheral pixels. On the other hand, as a disadvantage, the processing cannot be performed without format conversion because the shot JPEG image is subjected to interpolation processing.

The information amount is three times larger after the interpolation processing than before the interpolation processing, and thus the calculation cost is increased. The shot image requires format conversion from YCbCr to RGB.

Moreover, while the information of luminance (Y) and color difference (CbCr) is obtained after the YCbCr conversion, false color reduction processing requires only color-difference components, and thus the calculation cost is saved to ⅔ of that after the interpolation processing. Moreover, the shot JPEG image can be processed without format conversion.

Considering the above, (A) before the interpolation processing or (C) after the YCbCr conversion described above is suitable as the timing of noise reduction.

Here, several noise reduction methods will be presented.

(a) Low-Pass Filter (LPF)

The low-pass filter is a method of multiplying a target pixel and peripheral pixels by a weight coefficient, respectively, and calculating an average. In the case of processing of the R signal in FIG. 8A, for example, noise reduction is performed using R13 as the target pixel and using a 3×3 LPF as shown in FIG. 9A, thereby obtaining R13' as follows as a result of the pixel R13 after the noise reduction.

$$R13'=(R13\times4+(R1+R3+R5+R11+R15+R21+R23+R25))/12$$

In the case where the LPF is used for the color difference shown in FIG. 8C, Cr13' as the pixel Cr13 after the noise reduction is as follows.

$$Cr13'=(Cr13\times4+(Cr7+Cr8+Cr9+Cr12+Cr14+Cr17+Cr18+Cr19))/12$$

(b) Median Filter

A median filter is a method of setting an intermediate value among signal values of reference pixels as a signal value of a target pixel. In the case of processing of the R signal in FIG. 8A, for example, assuming R13 as the target pixel, the value of R13 is an intermediate value obtained when changing the order of R1 to R25.

(c) ε (Epsilon) Filter

A ε filter is a method of setting a certain threshold and calculating an average value of only pixels that meet threshold conditions among reference pixels. In the case of processing of the R signal in FIG. 8A, for example, a threshold T is set with R13 being the target pixel, and processing is performed using the ε filter assuming that threshold conditions are met when the signal value is not more than the threshold T. In this case, each of the signal values of R1 to R25 is compared with the threshold T, and an average value is calculated only among the signals whose values are not more than the threshold T. The ε filter is characterized by suitable filtering of edges and a flat portion, and thus enables noise reduction to be performed without lowering the resolution while saving the edges.

Note that although the noise reduction methods have been listed above, this embodiment is not limited to the above methods as long as false color reduction can be performed.

Next, description will be given of a noise reduction level (NR level) indicating the level of noise reduction.

(a) In the Case of Using the Low-Pass Filter (LPF)

One way of adjusting the NR level of noise reduction using the low-pass filter is using a filter coefficient of the LPF. As a measure of the level of noise reduction, a ratio of a center value (4 in FIG. 9A) of the LPF to the sum of all coefficients is used. The NR level is increased when the ratio is small, and the NR level is reduced when the ratio is large. In FIG. 9A, for example, the ratio of the center value of the LPF is 4/12, i.e.; 0.33. When the center value of the LPF is set to 1 as shown in FIG. 9B, the ratio becomes 1/9, i.e., 0.11, resulting in increased NR level. On the other hand, when the center value of the LPF is set to 8 as shown in FIG. 9C, the ratio becomes 8/16, i.e., 0.5, resulting in reduced NR level.

Another way of adjusting the NR level is a method of changing the number of times of executing the LPF processing. The larger the number of times of executing the LPF processing, the higher the noise reduction level.

(b) In the Case of Using the Median Filter

One way of adjusting the NR level of noise reduction using the median filter is a method of changing the number of times of executing the median filter processing. As in the case of the LPF, the larger the number of times of executing the median filter processing, the higher the noise reduction level.

(c) In the Case of Using the ε (Epsilon) Filter

One way of adjusting the NR level of noise reduction using the ε filter is a method of changing threshold setting.

Another way of adjusting the NR level is a method of changing the number of times of executing the ε filter processing. The larger the number of times of executing the ε filter processing, the higher the noise reduction level.

Note that although the methods for changing the noise reduction level have been listed above, this embodiment is not limited to the above methods as long as the noise reduction level can be changed.

The noise reduction level (NR level) during processing in Step S101 in FIG. 7 is a noise reduction level (NR1) used for normal shooting regardless of a false color reduction mode. Note that the image development (1) processing in Step S101 corresponds to processing by a first image creator. Also, image data created by the image development (1) processing corresponds to first noise-processed image data. Moreover, Step S101 serves as a first step.

[False Color (Color Moire) Reduction Mode Determination Processing]

In Step S102, it is determined whether a false color reduction mode is on or off. The false color reduction mode is a mode of performing processing of reducing false colors in a shot image. A camera is equipped with a function to turn on and off the false color reduction mode so that the user can choose before shooting. In Step S102, the determination is made using the on/off information on the false color reduction mode previously set by the user. When the false color reduction mode is off, no false color reduction processing is performed, the image created in Step S101 becomes a final image, and the image is subjected to JPEG compression and recorded in the memory card or the like. On the other hand, when the false color reduction mode is on, the processing advances to Step S103 for false color reduction processing.

[False Color Detection Processing]

In Step S103, false color detection is performed using the image created in Step S101. There have been proposed various false color detection methods. Some examples thereof will be described below.

(a) Edge Detection Method

Since a false color is likely to be generated in a region with a drastic change in the signal amount, edge extraction is performed on an image to detect the false color. When the image data is YCbCr data after the YCbCr conversion, edge detection is executed by performing filter processing on the image data using an edge extraction filter as shown in FIG. 10A for the luminance (Y). In the case of image data shown in FIG. 11A, for example, the amount of edges to be extracted is as follows.

$$\text{Edge amount}=Y13\times8+(Y7+Y8+Y9+Y12+Y14+Y17+Y18+Y19)\times(-1)$$

When the image data is RGB data before the YCbCr conversion, edge extraction is executed by performing filter processing on the image data using an edge extraction filter as shown in FIG. 10A for G pixels. In the case of image data shown in FIG. 11B, for example, the amount of edges to be extracted is as follows.

$$\text{Edge amount}=G13\times8+(G7+G8+G9+G12+G14+G17+G18+G19)\times(-1)$$

When the image data is one before the interpolation processing, edge extraction is executed by performing filter processing on the image data using an edge extraction filter as shown in FIG. 10B for Gr and Gb pixels. In the case of image data shown in FIG. 11C, for example, the amount of edges to be extracted is as follows.

$$\text{Edge amount}=Gr13\times4+(Gb7+Gb9+Gb17+Gb19)\times(-1)$$

Considering the horizontal and vertical directions, an edge extraction filter shown in FIG. 10C is used.

$$\text{Edge amount}=Gr13\times12+(Gr1+Gr3+Gr5+Gb7+Gb9+Gr11+Gr15+Gb17+Gb19+Gr21+Gr23+Gr25)\times(-1)$$

Based on a result of the edge extraction, a point where the edge is extracted is regarded as a false color generation spot, and the amount of edges extracted is regarded as a false color generation level.

(b) Color Detection Method

Figure 12A:
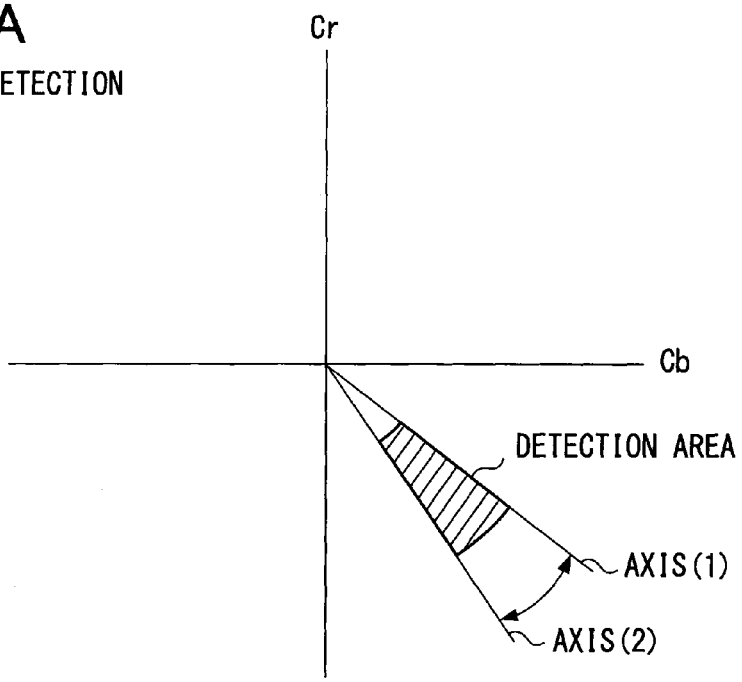
FIGS. 12A and 12B are diagrams showing a color detection method, FIG. 12A showing detection of hue and chroma and FIG. 12B showing detection of brightness.

The brightness, hue and chroma in case of a false color are limited to some extent. Thus, colors included in specific brightness, hue and chroma are detected, and color detection spots and chroma are obtained as a false color detection result. When the image data is the YCbCr data after the YCbCr conversion, luminance (Y) is used as the brightness, and color difference (Cb and Cr) information is used as the hue and chroma. For example, a CbCr space is partitioned by two axes (Axis (1) and Axis (2)) for the hue as shown in FIG. 12A, and a hue region between the two axes is narrowed down based on a distance from the origin (corresponding to the chroma), thereby setting a detection area (shaded region).

Figure 12B:
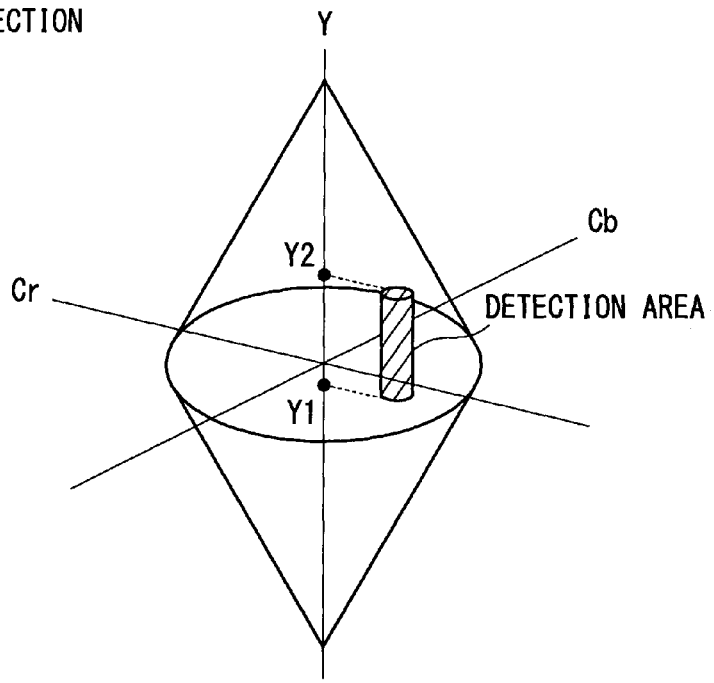

FIG. 12B shows a case where a luminance Y axis is added to the CbCr space. When the space is narrowed down also for the brightness, a range (Y1<Y<Y2) is set in the luminance direction of the CbCr space. Thus, the detection area (the shaded portion in FIG. 12B) can be set based on the brightness, hue and chroma. Note that not one detection area but multiple detection areas may be set in the false color generation region.

When the image data is the RGB data before the YCbCr conversion, the luminance is calculated, and the luminance Y is used as the brightness and color differences (R-Y and B-Y) are used as the hue and chroma. Alternatively, in a simple manner without calculating the luminance, the G signal is used as the brightness and color differences (R-G and B-G) are used as the hue and chroma.

The position of the pixel having information included in the detection area is regarded as the false color generation spot, and the chroma (the distance from the origin in the CbCr space) is regarded as the false color generation level.

(c) Combination

A method combining the edge detection method and the color detection method enables more accurate detection of false colors. When both of the edge detection and the color detection meet the conditions, false colors are detected. Alternatively, when any of the edge detection and the color detection meets the conditions, false colors are detected. The former case is effective in detecting only a region where a false color is generated, while the latter case has an advantage of detecting all portions suspected to be false colors.

The position of the pixel meeting the false color detection conditions is regarded as the false color generation spot. As to the false color generation level, since the two detection methods are used, normalization may be performed using a maximum possible value for the false color generation level of each detection method, and a larger value among the normalized values may be used. Alternatively, a new false color generation level may be calculated by obtaining a weighted average of the false color generation levels.

Note that the false color detection of this embodiment is not limited to the methods described above as long as the false color can be detected.

[NR Level Setting Processing]

In Step S104, a NR level (a new NR level: NR2) in image development performed in the next Step S106 is set based on the result of the false color detection in Step S103. As a result of the false color detection, information on the false color generation spot and the false color generation level is obtained. The NR level is set based on the false color generation level.

For the NR level setting, a table showing a relationship between the false color generation level and the NR level is previously set. For example, the NR level is set for the range of the false color generation level (FCL) as shown in FIG. 13. The larger NR level means stronger NR. When every pixel has information on the false color generation spot and the false color generation level, the NR level is set based on the maximum false color generation level in the entire image.

[NR Level Determination Processing]

In Step S105, the NR level (NR2) set in Step S104 is compared with the NR level (NR1) obtained in Step S101. When the relationship between the two NR levels is NR1<NR2, false color reduction is achieved by performing stronger NR than the case of Step S101 in Step S106, and thus the processing advances to Step S106. On the other hand, when the relationship between the NR levels is NR1≥NR2, the NR is weaker than that in Step S101, and thus false color reduction is not achieved. Therefore, the image acquired in Step S101 is outputted as the final image without false color reduction.

[Image Development (2) Processing]

In Step S106, image development (2) is performed at the NR level (NR2) determined in Step S104. The development is performed from the RAW data by changing only the NR level from Step S101. Note that the image development (2) processing in Step S106 corresponds to processing by a second image creator. Also, image data created by the image development (2) processing corresponds to second noise-processed image data. Moreover, Step S106 serves as a second step.

[Image Synthesis Table Creation Processing]

In Step S107, an image synthesis table is created to determine a synthesis rate for synthesizing the images, which are created in Steps S101 and S106, in Step S108. To create the image synthesis table, the result of the false color detection in Step S103 is used. A method for creating the image synthesis table will be described below by giving a concrete example.

Although the information on the false color generation spot and the false color generation level is obtained by the pixel from the false color detection result, the image synthesis table is created by the pixel with reference to the false color generation level for each pixel.

A table is previously set, in which the false color generation level and the image synthesis ratio are specified. As shown in FIG. 14A, for example, an image ratio (synthesis ratio: 0 to 1) of the NR level created in Step S106 is set for the false color generation level (FCL). The higher the synthesis ratio, the higher the ratio of the image having the NR level (NR2).

Also, in the case of an image having a false color generation level as shown in FIG. 14B, for example, an image synthesis table as shown in FIG. 14C is created, in which a synthesis ratio for each pixel is determined based on the false color generation level for each pixel and the synthesis ratio table in FIG. 14A.

Although the image synthesis table is created referring to the image synthesis ratio table for each pixel in FIG. 14C, the image synthesis table may be created by dividing the image into arbitrary blocks in the horizontal and vertical directions and then calculating an image synthesis ratio from an average of false color generation levels among the blocks.

[Image Synthesis Processing]

In Step S108, the images created in Steps S101 and S106 are synthesized according to the image synthesis table created in Step S107.

In image synthesis, assuming that the coefficient of the image synthesis table is a, the image in Step S101 is image (1) and the image in Step S106 is image (2), composite pixels are obtained by calculating image (1) pixels×(1−α)+image (2) pixels×α for pixels at the same position in image (1) and image (2), and a composite image is obtained by calculating the above for all the pixels. Note that the image synthesis table creation processing in Step S107 and the image synthesis processing in Step S108 correspond to processing by an image synthesizer. Also, Steps S107 and S108 serve as a third step.

According to this embodiment, data on two images is created by performing noise reduction processing (the processing of Step S106 in FIG. 7) with different noise reduction levels (the noise reduction level in Step S101 in FIG. 7) for one image. Thus, an image not subjected to false color reduction and an image subjected to false color reduction can be created.

Since the image synthesis table is creased and the two images are synthesized according to the image synthesis table, the false color reduction level can be easily adjusted. Furthermore, the resolution in the region to adjust the false color reduction level can be easily adjusted by the pixel, by the block or the like, depending on how to create the image synthesis table.

Furthermore, the first image and the second image are synthesized by taking a weighted average thereof in accordance with the ratio in the image synthesis table. This makes it possible to change the false color reduction according to the false color generation level in the false color generation portion, and to perform no false color reduction in the other portions.

Moreover, as the image synthesis table creation method, the false color reduction in the false color generation spot can be enhanced by increasing the image data ratio with a high noise reduction level in a spot with a high false color generation level. Meanwhile, in a spot with no false color generated, the image data ratio with a low noise reduction level is increased. Thus, a side effect (e.g., color blurring and the like) of strong noise reduction can be minimized.

Furthermore, for the false color reduction, it is often the case that special color interpolation processing is adopted or complex processing circuits are mounted. However, in this embodiment, false color reduction can be performed using a general image processing circuit without special false color reduction circuit.

Moreover, according to this embodiment, the false color generation level is detected from the first image subjected to the noise reduction processing in Step S101, and the noise reduction level is determined for the second image in Step S104. Thus, an image can be created, in which more false colors are reduced in the second image than in the first image. In this case, the noise reduction processing is not performed when the conditions are not met. As a result, unnecessary noise reduction processing can be omitted, and thus processing time can be reduced.

Embodiment 2

Next, Embodiment 2 will be described. Although the false color reduction method using the RAW data has been described in Embodiment 1, it is preferable that false color reduction can be performed also for shot image data. This embodiment is characterized by false color reduction from images stored in JPEG format.

Figure 15:
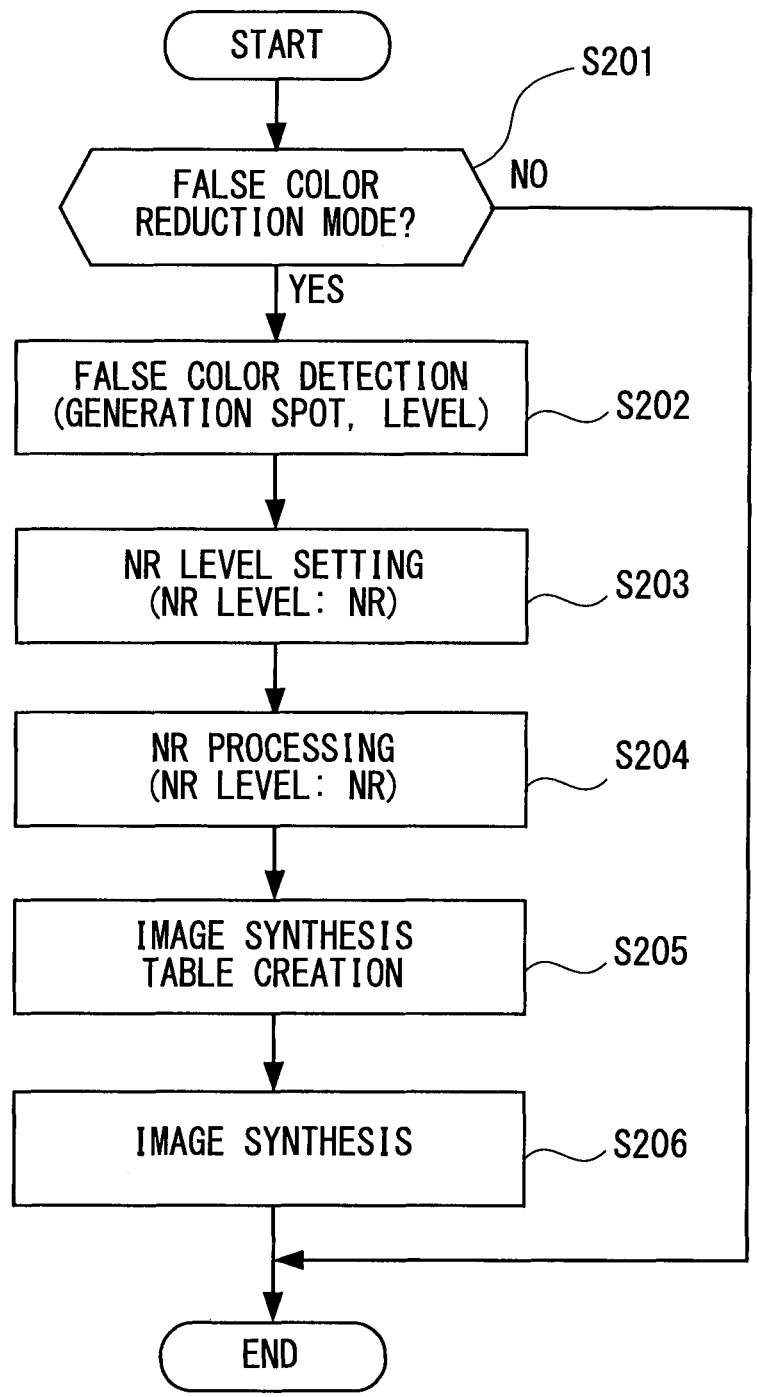
FIG. 15 is a diagram showing a process flow in Embodiment 2 to process JPEG data.

As shown in FIG. 15, a process flow in this embodiment includes false color (color moire) reduction mode determination processing (Step S201), false color detection processing (Step S204), NR level determination processing (Step S203), NR processing (Step S204), image synthesis table creation processing (Step S205), and image synthesis processing (Step S206). Note that JPEG extension and compression processing is omitted in the process flow shown in FIG. 15.

The process flow of this embodiment is different from that of Embodiment 1 shown in FIG. 7 in that noise reduction is further performed on JPEG data already subjected to noise reduction, in the NR level determination processing of Step S203. For this reason, it is preferable to set a low NR level, unlike the case of the RAW data. Then, in Step S204, only NR processing is performed on the JPEG data.

As for the other processing, false color reduction processing is also performed on the JPEG data using the same method as that in Embodiment 1.

Note that this embodiment is applicable not only to the JPEG format but also another image format as long as the format has more than one pixel information in one pixel, such as TIFF, PNG and BMP, and does not require information interpolation from peripheral pixels.

While the embodiments of the present invention have been described in detail above with reference to the drawings, the above embodiments are merely examples of the present invention. The present invention is not limited to only the configurations of the above embodiments, but, needless to say, includes changes in design and the like without departing from the scope of the present invention.

According to the present invention, false colors generated in images can be reduced with a simple process configuration only by creating and synthesizing the first and second noise-processed image data.

The present application is based on and claims priority from Japanese Patent Application No. 2012-198043, filed on Sep. 10, 2012, the disclosure of which is hereby incorporated by reference in its entirety.

The invention claimed is:

1. An image processor comprising:
    circuitry configured to
    create first noise-processed image data by performing noise reduction processing on data on one image acquired by an imaging device;
    create second noise-processed image data by performing noise reduction processing based on a false color generated in the first noise-processed image data; and
    perform false color reduction by synthesizing the first noise-processed image data and the second noise-processed image data.

2. The image processor according to claim 1, wherein the circuitry is configured to create an image synthesis table to determine a synthesis ratio for synthesis of the first noise-processed image data and the second noise-processed image data, and further configured to synthesize both noise-processed image data according to the image synthesis table.

3. The image processor according to claim 2, wherein the circuitry is configured to synthesize the first noise-processed image data and the second noise-processed image data by taking a weighted average thereof according to the synthesis ratio in the image synthesis table.

4. An imaging apparatus including an optical system having a lens, an imaging device to take an image of a subject by the optical system, and a controller which controls the optical system and the imaging device, wherein
    the controller is equipped with the image processor according to claim 3.

5. The image processor according to claim 1, wherein the circuitry is further configured to perform the noise reduction processing at a predetermined noise reduction level.

6. The image processor according to claim 1, wherein the circuitry is configured to:

store a table in which a relation between a false color generation level and a noise reduction level is previously specified;

determine a new noise reduction level based on the detected false color generation level and the table; and perform the noise reduction processing at the new noise reduction level.

7. The image processor according to claim 5, wherein the circuitry is configured to:

store a table in which a relation between a false color generation level and a noise reduction level is previously specified;

determine a new noise reduction level based on the detected false color generation level and the table; and perform the noise reduction processing at the new noise reduction level.

8. The image processor according to claim 6, wherein the circuitry is configured to perform the noise reduction processing at the new noise reduction level when the new noise reduction level is larger than the noise reduction level for the first image.

9. An imaging apparatus including an optical system having a lens, an imaging device to take an image of a subject by the optical system, and a controller which controls the optical system and the imaging device, wherein the controller is equipped with the image processor according to claim 8.

10. The image processor according to claim 7, wherein the circuitry is configured to perform the noise reduction processing at the new noise reduction level when the new noise reduction level is larger than the noise reduction level for the first image.

11. An imaging apparatus including an optical system having a lens, an imaging device to take an image of a subject by the optical system, and a controller which controls the optical system and the imaging device, wherein the controller is equipped with the image processor according to claim 10.

12. The image processor according to claim 1, wherein a timing of performing noise reduction processing is based on a desired calculation cost for the image processor.

13. The image processor according to claim 1, wherein the noise reduction processing further includes:

performing interpolation processing; and performing color and luminance conversion processing on the image data, wherein the noise reduction processing is performed before the interpolation processing and luminance and color conversion processing.

14. The image processor according to claim 13, wherein the noise reduction processing further includes:

adjusting a noise reduction level depending on a low pass filter coefficient, wherein the coefficient is equivalent to a ratio of a center value of a selected group of pixels to a sum of all coefficients of surrounding pixels.

15. The image processor according to claim 1, wherein performing false color reduction further includes:

identifying a group of pixels of interest;

extract an edge of the group of pixels of interest;

identify a false color generation spot based on a point where the edge is extracted; and identify a false color generation level based on a number of edges extracted.

16. The image processor according to claim 1, wherein performing false color reduction further includes performing a combination of edge detection and color detection.

17. The image processor according to claim 1, wherein the noise reduction processing is performed on image data that has already been subjected to noise reduction.

18. An image processing method comprising:

creating, with circuitry, first noise-processed image data by performing noise reduction processing on data on one image acquired by an imaging device;

creating, with circuitry, second noise-processed image data by performing noise reduction processing based on a false color generated in the first noise-processed image data; and performing, with circuitry, false color reduction by synthesizing the first noise-processed image data and the second noise-processed image data.

* * * * *